United States Patent
Shi et al.

(10) Patent No.: US 10,838,707 B2
(45) Date of Patent: Nov. 17, 2020

(54) RUNTIME UPDATE OF INTEL SERVER PLATFORM SERVICES' NODE MANAGER SETTINGS IN BIOS EEPROM

(71) Applicant: DELL PRODUCTS L.P., Round Rock, TX (US)

(72) Inventors: Rui Shi, Cedar Park, TX (US); Jordan Chin, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 62 days.

(21) Appl. No.: 16/041,186

(22) Filed: Jul. 20, 2018

(65) Prior Publication Data

US 2020/0026506 A1    Jan. 23, 2020

(51) Int. Cl.
| | |
|---|---|
| *G06F 9/00* | (2006.01) |
| *G06F 15/177* | (2006.01) |
| *G06F 8/65* | (2018.01) |
| *G06F 9/445* | (2018.01) |
| *G06F 9/4401* | (2018.01) |

(52) U.S. Cl.
CPC .............. *G06F 8/65* (2013.01); *G06F 9/4411* (2013.01); *G06F 9/44505* (2013.01)

(58) Field of Classification Search
CPC ...................................................... G06F 8/65
See application file for complete search history.

(56) References Cited

U.S. PATENT DOCUMENTS

| | | | |
|---|---|---|---|
| 8,386,757 B1* | 2/2013 | Midgley | ............... G06F 9/4401 713/1 |
| 9,367,671 B1 | 6/2016 | Dobrovolskiy et al. | |
| 9,389,878 B1 | 7/2016 | Chan et al. | |
| 9,448,810 B2 | 9/2016 | Ali et al. | |
| 9,465,958 B2 | 10/2016 | Gardner | |
| 9,465,959 B2 | 10/2016 | Gardner | |
| 9,542,197 B2 | 1/2017 | Ali et al. | |
| 9,626,181 B2 | 4/2017 | Liu et al. | |
| 9,753,738 B2 | 9/2017 | Ali et al. | |
| 9,753,742 B2 | 9/2017 | Ali et al. | |
| 9,779,241 B2 | 10/2017 | Jacobs et al. | |
| 10,025,576 B2 | 7/2018 | Martinez et al. | |
| 10,101,928 B2 | 10/2018 | Nijhawan et al. | |
| 10,120,678 B2 | 11/2018 | Downum et al. | |
| 10,261,709 B2 | 4/2019 | Suryanarayana et al. | |
| 10,331,423 B1* | 6/2019 | Parsolano | ................. G06F 8/38 |
| 2007/0169076 A1* | 7/2007 | Desselle | ................... G06F 8/65 717/168 |
| 2010/0287247 A1* | 11/2010 | Kohring | ................ G06F 21/606 709/206 |
| 2015/0067838 A1* | 3/2015 | Gunti | ...................... G06F 21/51 726/22 |

* cited by examiner

*Primary Examiner* — Mohammed H Rehman
(74) *Attorney, Agent, or Firm* — Jackson Walker LLP; Christopher J. Rourk

(57) ABSTRACT

A system for distributing a basic input output system (BIOS), comprising a BIOS settings system configured to receive BIOS settings data, a BIOS binary system configured to receive BIOS binary code, a processor configured to load BIOS firmware from a memory and a code packager coupled to the memory, the code packager configured to combine the BIOS settings data and the BIOS binary code, to generate the BIOS firmware and to store the BIOS firmware in the memory.

15 Claims, 2 Drawing Sheets

US 10,838,707 B2

RUNTIME UPDATE OF INTEL SERVER PLATFORM SERVICES' NODE MANAGER SETTINGS IN BIOS EEPROM

TECHNICAL FIELD

The present disclosure relates generally to configuring special purpose processors, and more specifically to runtime update of Intel Server Platform Services' Node Manager Settings in BIOS EEPROM.

BACKGROUND OF THE INVENTION

Updating the firmware code that is used to operate a processor is a manually intensive process, because there is no system to allow that process to be performed in any other manner.

SUMMARY OF THE INVENTION

A system for distributing a basic input output system (BIOS) is disclosed. The system includes a BIOS settings system that is configured to receive BIOS settings data and a BIOS binary system that is configured to receive BIOS binary code. The system also includes a processor configured to load BIOS firmware from a memory and a code packager coupled to the memory, where the code packager is configured to combine the BIOS settings data and the BIOS binary code, to generate the BIOS firmware and to store the BIOS firmware in the memory.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
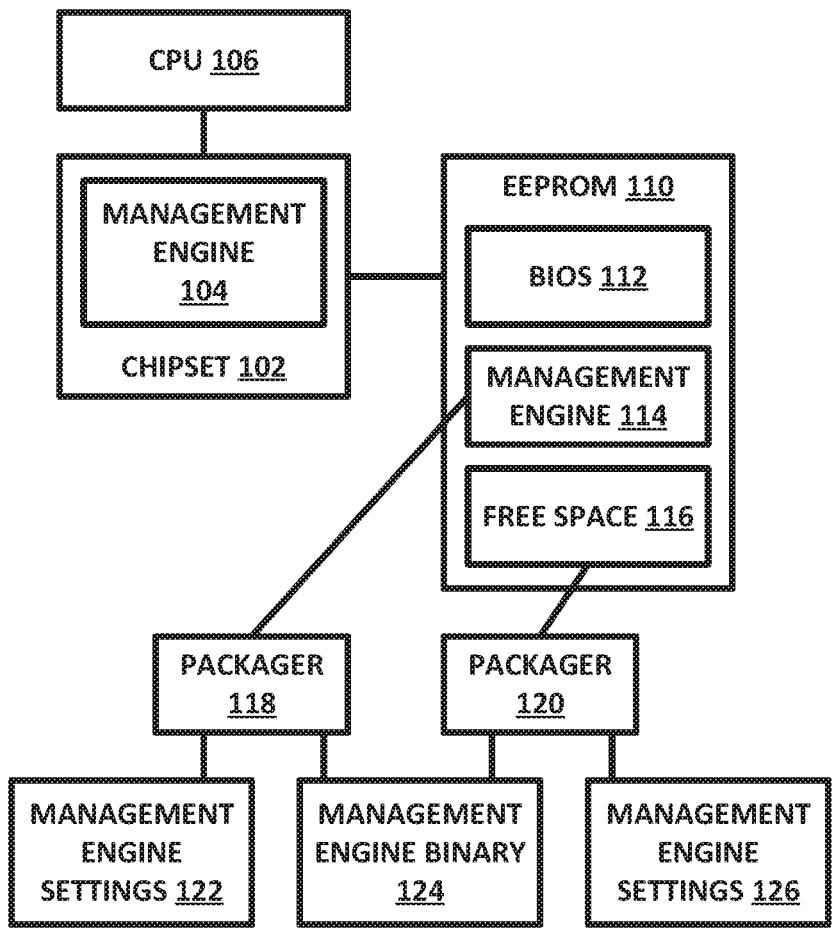
FIG. 1 is a diagram of a system for runtime update of settings, such as node manager, in a BIOS EEPROM, such as a serial peripheral interface flash, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

Intel provides a system known as the management engine or manageability engine as an autonomous subsystem in its processor chipsets, and other processors include similar functionality. The management engine can include firmware running on a separate processor, such as to perform predetermined tasks during boot-up, while the main processor is running, while the main processor is in a reduced "sleep" mode or for other purposes. One aspect of the management engine is that it continues to run even when the system is turned off, as long as the chipset is connected to a power source.

Management engine firmware configurations are typically defined during compile time, which means that for each different platform management engine XML configuration, there will be a separate BIOS image to support that platform. This multiplies the amount of work that needs to be performed for release engineers, project managers, testers, and consumers as they will need to maintain a unique BIOS for each different platform. The present disclosure reduces overhead by using a single BIOS binary to support multiple platforms.

In one example embodiment, the Intel Server Platform Services (SPS) can be used to provide the management engine firmware. The Intel management engine is a microcontroller integrated into the Platform Controller Hub (PCH) of the Intel chipset, and has functions that can be subdivided into two categories: silicon enabling and node manager. Silicon enabling functions include settings to bring up the platform, such as clock speeds, flash settings, platform controller hub memory speed settings and so forth. The node manager functions include settings to monitor and control power usage and thermal limits on the CPU or chipset. Both of these settings can be statically created at compile time and written into the serial peripheral interface flash as a part of the management engine firmware, which is delivered as a part of the system BIOS.

The settings for the silicon enabling functions, the node manager functions and other functions of the management engine are typically configurable, and can be adjusted by changing data stored in an XML file. The XML file is an input to the BIOS build system to create the final management engine image that is to be integrated into a final BIOS serial peripheral interface image. One problem that arises from this process is that each platform with different node manager settings will need to have a unique BIOS to support it due to the fact that the settings are set during compile time. This constraint increases the amount of work for release engineers, project managers, testers, and consumers as they will need to maintain a unique BIOS for each different platform.

The present disclosure uses a single BIOS that can dynamically modify the serial peripheral interface image during runtime to match the node manager settings of the running platform. This process simplifies the BIOS release process and reduces overhead for the project manager, as it will only need the release of a single BIOS for multiple platforms. Currently, there are no methods for updating node manager specific settings (such as sensor data, power capping, power threshold coefficients) during runtime, and it is necessary to subdivide platforms in order to provide that functionality.

To facilitate dynamic configuration, the following steps can be implemented in the BIOS build system and runtime code. First, during compile time, the BIOS build system can create different management engine regions (1 through n) using platform specific XMLs, with management engine region 1 being assigned as the default region that is built into the initial BIOS serial peripheral interface image. Next, for management engine regions 2 through n, the node manager configurations and platform controller hub memory speed sections (~129 KB per platform) are extracted. Third, these sections are put into a location in final BIOS serial peripheral interface image. Fourth, during runtime on the first boot, the BIOS can detect the platform that it's running on and compare the currently running settings with the corresponding platform settings stored in the serial peripheral interface image. Fifth, if it is determined that the settings match, then execution continues, but if the settings do not match, then the serial peripheral interface is updated with the correct settings for the currently running platform.

To perform the update, the management engine firmware is moved into recovery mode to unlock the management engine serial peripheral interface region for writing, and the platform controller hub memory speed settings, management engine file system configuration settings and other settings in the currently running management engine region are extracted using the serial peripheral interface protocol. The corresponding platform controller hub memory speed settings and other settings for the platform are read and then written to a corresponding location for the currently running management engine region. A host management engine region flash protection override lock command, such as an HMRFPO_LOCK command, can then be sent using the host embedded controller interface, such as HECI1, to validate the previous write, or other suitable processes can also or alternatively be used.

After that, a host management engine region flash protection management engine reset command, such as an HMRFPO_MERESET command, can be transmitted in the same manner or other suitable manners, to bring the management engine firmware back to operational status. The management engine firmware can now detect the new management engine file system backup settings and update the management engine file system section.

FIG. 1 is a diagram of a system 100 for runtime update of settings, such as node manager, in a BIOS EEPROM, such as a serial peripheral interface flash, in accordance with an example embodiment of the present disclosure. System 100 includes chipset 102 with management engine 104, CPU 106, EEPROM 110 which includes BIOS 112, management engine 114 and free space 116, packagers 118 and 120, management engine settings 122 and 126 and management engine binary 124, each of which can be implemented in hardware or a suitable combination of hardware and one or more associated algorithms, as described further herein.

Chipset 102 is a semiconductor device that includes a suitable configuration of integrated circuits, such as memory, configurable logic, buses, clocks, input/output devices and so forth. Chipset does not have any specific requirements other than those set forth herein, and also includes firmware that is used to configure the specific operations of chipset 102. Chipset 102 is not a general purpose processor for all purposes, but rather has certain limited programmable functionality with the specific functionality discussed herein, including but not limited to management engine 104.

Management engine 104 is a component of chipset 102, and provides the specific functionality disclosed herein, such as a microcontroller integrated into a platform controller hub of chipset 102 with silicon enabling and node management functions, and other suitable functionality. Management engine 104 also includes firmware that is used to configure the specific operations of management engine 104, and is not a general purpose processor for all purposes, but rather has certain limited programmable functionality with the additional specific functionality discussed herein.

CPU 106 is a central processor unit that is controlled by chipset 102. In one example embodiment, chipset 102 can be used to provide server platform services for a server, such as bring-up and kernel functionality that is used to control one or more CPUs and associated components such as power supply units and memory in a server.

EEPROM 110 is an electronically erasable programmable read only memory that can be used to store firmware code for use by chipset 102, management engine 104 and other suitable devices. In one example embodiment, EEPROM 110, chipset 102 and packagers 118 and 120 are configured to allow chipset 102 and packagers 118 and 120 to access EEPROM 110 and to prevent access to EEPROM 110 by other potentially adverse systems.

BIOS 112 is basic input/output system firmware that is used to control the operation of chipset 102, and which is loaded onto chipset 102 at startup. In one example embodiment, chipset 102 can be configured to access a predetermined memory address of EEPROM 110 at start up and to load the instructions stored in the memory for use in controlling the operations of chipset 102.

Management engine 114 is firmware that is used to control the operation of chipset 102, and which is loaded onto chipset 102 at startup. In one example embodiment, chipset 102 can be configured to access a predetermined memory address of EEPROM 110 at start up and to load the instructions stored in the memory for use in controlling the operations of management engine 114.

Free space 116 is unused memory space in EEPROM 110, which can be used to store additional instructions if needed.

Packagers 118 and 120 assemble management engine XML settings and management engine binary code into firmware that can be stored in management engine 114. In one example embodiment, packagers 118 and 120 can encrypt or otherwise obfuscate the code to prevent it from being easily reverse engineered.

Management engine settings 122 and 126 can be implemented as XML data fields that can be modified by a user, as discussed further herein. In one example embodiment, the management engine binary 124 and packagers 118 and 120 can be configured to allow a user to modify the functionality of management engine 114 by changing the data values stored in management engine settings 122 and 126, such as to accommodate different hardware configurations or for other suitable purposes.

In operation, system 100 allows the operation of management engine 104 to be readily configured without substantial user interaction, to facilitate changes to the configuration of management engine 104. Additional details regarding the operation of an example embodiment of system 100 are provided herein, but other suitable functions can also or alternatively be provided.

Figure 2:
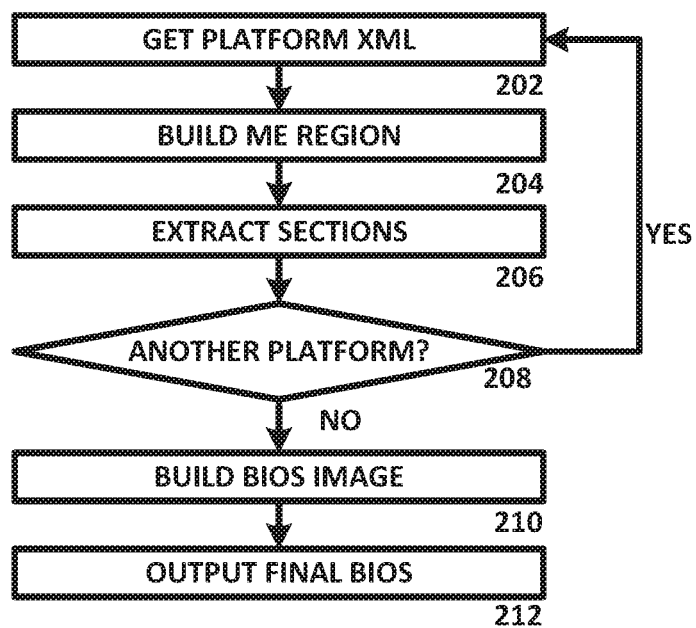
FIG. 2 is a diagram of an algorithm for runtime update of settings, such as node manager, in a BIOS EEPROM, such as a serial peripheral interface flash, in accordance with an example embodiment of the present disclosure.

FIG. 2 is a diagram of an algorithm 200 for runtime update of settings, such as node manager, in a BIOS EEPROM, such as a serial peripheral interface flash, in accordance with an example embodiment of the present disclosure. Algorithm 200 can be implemented in hardware or a suitable combination of hardware and software, and can operate on one or more processors.

Algorithm 200 begins at 202, where platform XML is obtained. The algorithm then proceeds to 204.

At 204, a management engine region is built. As discussed above, the management engine section can be built by creating different management engine regions using platform specific XML data obtained at 202, or in other suitable manners, such as where management engine region 1 begin the default region that is built into the initial BIOS serial peripheral interface image, or in other suitable manners. The algorithm then proceeds to 206.

At 206, platform controller hub memory speed and management engine file system backup data, such as Intel management engine factory preset configuration sections, are extracted. The algorithm then proceeds to 208.

At 208, it is determined whether there is another platform. If it is determined that there is another platform, the algorithm returns to 202, otherwise the algorithm proceeds to 210 where the bios image is built, such as by using the first management engine region as a default or in other suitable manners. The algorithm then proceeds to 212.

At 212, the extracted platform controller hub memory speed, management engine file system backup data and other suitable data from other platforms is inserted into the BIOS serial peripheral interface image, and the final BIOS serial peripheral interface image is output.

In operation, algorithm 200 allows runtime update of settings, such as node manager, in a BIOS EEPROM, such as a serial peripheral interface flash. While algorithm 200 is shown as a flow chart, it can also or alternatively be implemented as two or more flow charts, one or more objects or agents, one or more state diagrams, on one or more processors or other devices, or in other suitable manners.

Figure 3:
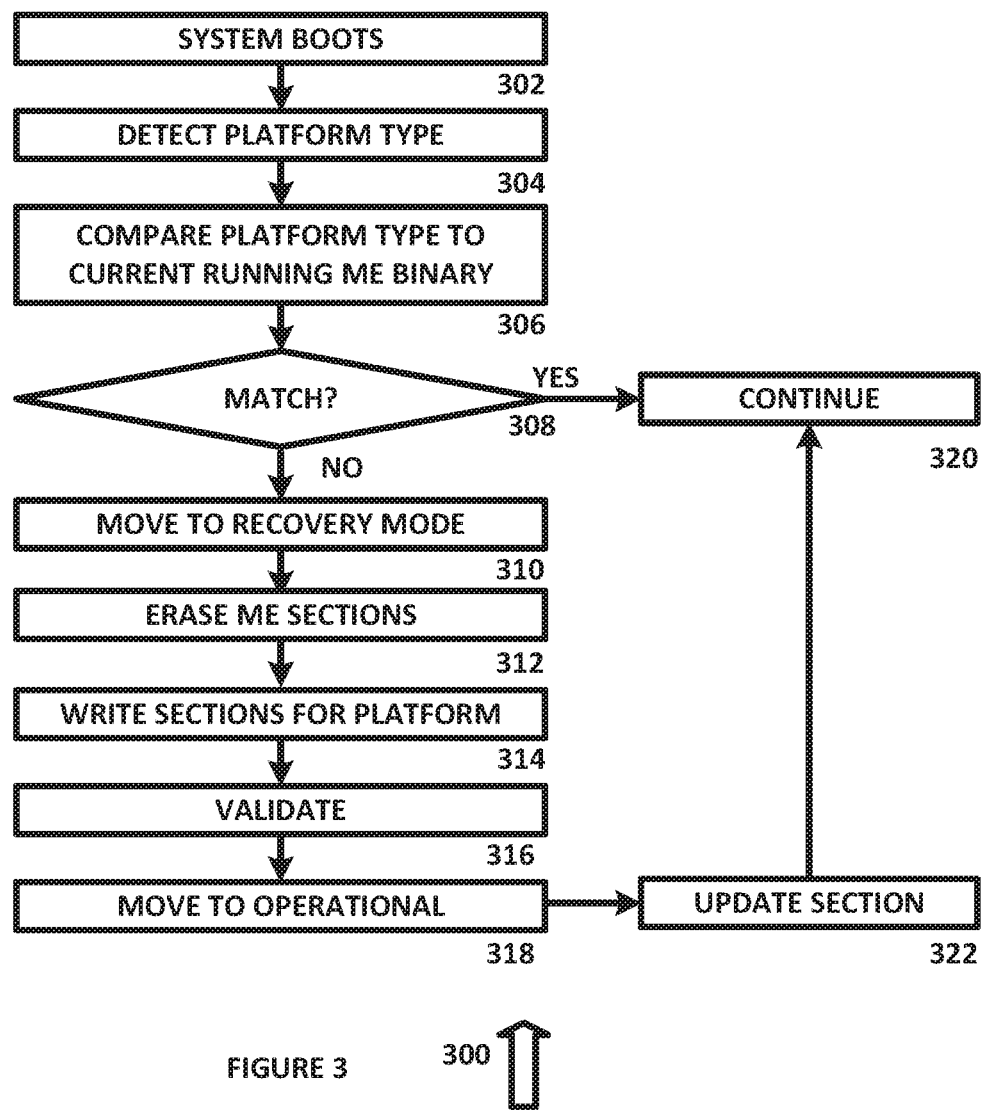
FIG. 3 is a diagram of an algorithm for runtime update of settings, such as node manager, in a BIOS EEPROM, such as a serial peripheral interface flash, in accordance with an example embodiment of the present disclosure.

FIG. 3 is a diagram of an algorithm 300 for runtime update of settings, such as node manager, in a BIOS EEPROM, such as a serial peripheral interface flash, in accordance with an example embodiment of the present disclosure. Algorithm 300 can be implemented in hardware or a suitable combination of hardware and software, and can operate on one or more processors.

Algorithm 300 begins at 302, where the system boots. In one example embodiment, the system can load code from an EEPROM or other suitable memory device during the system boot and can perform other suitable functions. The algorithm then proceeds to 304.

At 304, the current platform type is detected. In one example embodiment, the platform type can be detected by reading one or more registers or performing other suitable functions. The algorithm then proceeds to 306.

At 306, the detected platform type is compared to the current running management engine binary. In one example embodiment, predetermined memory locations associated with the current running management engine binary or other suitable data can be compared to the management engine settings of the detected platform type, such as by doing a simple compare or in other suitable manners. The algorithm then proceeds to 308.

At 308, it is determined whether there was a match. If there was a match, the algorithm proceeds to 320 and continues, otherwise the algorithm proceeds to 310.

At 310, the management engine is moved to a recovery mode. In one example embodiment, a host management engine region flash protection override enable command, such as an HMRFPO_ENABLE command or other suitable commands, can be generated to move the management engine to a recovery mode, or other suitable processes can also or alternatively be performed. The algorithm then proceeds to 312.

At 312, the management engine sections are erased. In one example embodiment, platform controller hub memory timing, management engine file system backup and management engine file system sections in the currently running management engine region can be erased, or other suitable processes can also or alternatively be implemented. The algorithm then proceeds to 314.

At 314, sections are written for the platform. In one example embodiment, platform controller hub memory speed and management engine file system backup sections can be written to the location in the currently running management engine region. The algorithm then proceeds to 316.

At 316, the written sections are validated. In one example embodiment, a host management engine region flash protection management engine reset command, such as an HMRFPO_MERESET command, can be transmitted, to bring the management engine firmware back to operational status. The algorithm then proceeds to 318.

At 318, the BIOS is moved to operational. A host management engine region flash protection override lock command, such as an HMRFPO_LOCK command, can be sent using the host embedded controller interface, such as HECI1, to validate the previous write, or other suitable processes can also or alternatively be used. The algorithm then proceeds to 322.

At 322, the management engine file system section is updated. In one example embodiment, the management engine firmware detects new management engine file system backup settings and updates the management engine file system, and can also or alternatively perform other suitable functions. The algorithm then continues at 320.

In operation, algorithm 300 allows runtime update of settings, such as node manager, in a BIOS EEPROM, such as a serial peripheral interface flash. While algorithm 300 is shown as a flow chart, it can also or alternatively be implemented as two or more flow charts, one or more objects or agents, one or more state diagrams, on one or more processors or other devices, or in other suitable manners.

Because the BIOS itself is not capable of reading/writing the management engine node manager settings because of the obfuscation or encryption by the packager, it is necessary to maintain a static assignment of what binary should run based on which platform type. This can be accomplished by building an EEPROM binary with a default management engine section (such as the binary code and settings) for a first platform type, then building an EEPROM binary for an alternate management engine section for a second platform. After the system boots for the first time, the BIOS detects whether the platform is of the first type or second type, and swaps out the EEPROM binary if it is the second type. Additional platform types can also be accommodated.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for distributing a basic input output system (BIOS), comprising:
a BIOS settings system configured to receive BIOS settings data;
a BIOS binary system configured to receive BIOS binary code;
a processor configured to load BIOS firmware from a memory; and
a code packager coupled to the memory, the code packager configured to combine the BIOS settings data and the BIOS binary code, to generate the BIOS firmware and to store the BIOS firmware in the memory, wherein the code packager is configured to combine default management engine settings data and a management engine binary, to generate default management engine firmware, to encrypt the default management engine firmware and to store the encrypted default management engine firmware in the memory, and to combine alternate management engine settings data and the management engine binary, to generate alternate management engine firmware, to encrypt the alternate management engine firmware and to store the encrypted alternate management engine firmware in the memory.

2. The system of claim 1 wherein the BIOS settings system is configured to receive management engine settings data and the processor includes a management engine.

3. The system of claim 1 wherein the BIOS binary system is configured to receive management engine binary code and the processor includes a management engine.

4. The system of claim 1 wherein the processor is configured to load management engine code from the memory.

5. A method for distributing a basic input output system (BIOS), comprising:
receiving BIOS settings data at a BIOS settings system;
receiving BIOS binary code at a BIOS binary system;
loading BIOS firmware from a memory to a processor; and
combining the BIOS settings data and the BIOS binary code using a code packager;
generating the BIOS firmware using the code packager; and
storing the BIOS firmware in the memory using the code packager, wherein the code packager is configured to combine default management engine settings data and a management engine binary, to generate default management engine firmware, to encrypt the default management engine firmware and to store the encrypted default management engine firmware in the memory, and to combine alternate management engine settings data and the management engine binary, to generate alternate management engine firmware, to encrypt the alternate management engine firmware and to store the encrypted alternate management engine firmware in the memory.

6. The method of claim 5 further comprising receiving management engine settings data at the BIOS settings system, wherein the processor includes a management engine.

7. The method of claim 5 further comprising receiving management engine binary code at the BIOS binary system, wherein the processor includes a management engine.

8. The method of claim 5 further comprising loading management engine code from the memory using the processor.

9. The method of claim 5 further comprising:
combining management engine settings data and the management engine binary using the code packager;
generating management engine firmware using the code packager; and
storing the management engine firmware in the memory using the code packager.

10. The method of claim 5 further comprising:
combining the default management engine settings data and the management engine binary using the code packager;
generating the default management engine firmware using the code packager;
storing the encrypted default management engine firmware in the memory using the code packager;
combining alternate management engine settings data and the management engine binary using the code packager;
generating the alternate management engine firmware using the code packager; and
storing the encrypted alternate management engine firmware in the memory using the code packager.

11. A system for distributing a basic input output system (BIOS), comprising:
means for receiving BIOS settings data;
means for receiving BIOS binary code;
a processor configured to load BIOS firmware from a memory; and
a code packager coupled to the memory, the code packager configured to combine the BIOS settings data and the BIOS binary code, to generate the BIOS firmware and to store the BIOS firmware in the memory, wherein the code packager is configured to combine default management engine settings data and a management engine binary, to generate default management engine firmware, to encrypt the default management engine firmware and to store the encrypted default management engine firmware in the memory, and to combine alternate management engine settings data and the management engine binary, to generate alternate management engine firmware, to encrypt the alternate management engine firmware and to store the encrypted alternate management engine firmware in the memory.

12. The system of claim 11 further comprising means for receiving management engine settings data and the processor includes a management engine.

13. The system of claim 11 further comprising means for receiving management engine binary code and the processor includes a management engine.

14. The system of claim 11 wherein the processor is configured to load management engine code from the memory.

15. The system of claim 11 wherein the code packager is configured to combine management engine settings data and the management engine binary, to generate management engine firmware and to store the management engine firmware in the memory.

* * * * *